United States Patent [19]

Luciani et al.

[11] Patent Number: 5,521,135
[45] Date of Patent: *May 28, 1996

[54] SOLID COMPONENT OF CATALYST FOR THE (CO)POLYMERIZATION OF ETHYLENE

[75] Inventors: Luciano Luciani, Ferrara; Maddalena Pondrelli, Bologna; Renzo Invernizzi, Milan; Italo Borghi, Ferrara, all of Italy

[73] Assignee: ECP Enichem Polimeri s.r.l., Milan, Italy

[ * ] Notice: The term of this patent shall not extend beyond the expiration date of Pat. No. 5,278,117.

[21] Appl. No.: 166,143

[22] Filed: Dec. 14, 1993

Related U.S. Application Data

[63] Continuation of Ser. No. 773,421, Oct. 9, 1991, abandoned.

[30] Foreign Application Priority Data

Oct. 11, 1990 [IT] Italy ...................... 21711/90

[51] Int. Cl.⁶ .................. C08F 4/654; C08F 4/656; C08F 10/02
[52] U.S. Cl. .................. 502/120; 526/124.6; 526/124.5; 526/352
[58] Field of Search .................. 526/125; 502/120

[56] References Cited

U.S. PATENT DOCUMENTS

| | | | |
|---|---|---|---|
| 4,175,170 | 11/1979 | Schweier et al. | 526/125 |
| 4,218,339 | 8/1980 | Zucchini et al. | 526/125 |
| 4,226,741 | 10/1980 | Luciani et al. | |
| 4,296,223 | 10/1981 | Berger | 526/125 |
| 4,331,561 | 5/1982 | Luciani et al. | |
| 4,359,561 | 11/1982 | Fraser et al. | |
| 4,390,454 | 6/1983 | Cuffiani et al. | 526/114 |
| 4,983,694 | 1/1991 | Furtek | 526/129 |
| 5,024,982 | 6/1991 | Hawley et al. | |
| 5,173,465 | 12/1992 | Luciani et al. | |
| 5,188,997 | 2/1993 | Luciani et al. | |
| 5,227,439 | 7/1993 | Luciani et al. | |
| 5,258,342 | 11/1993 | Luciani et al. | |
| 5,270,275 | 12/1993 | Luciani et al. | |
| 5,278,117 | 1/1994 | Luciani et al. | 526/125 |

FOREIGN PATENT DOCUMENTS 0446989  9/1991  European Pat. Off. .

*Primary Examiner*—Edward J. Smith
*Attorney, Agent, or Firm*—Oblon, Spivak, McClelland, Maier & Neustadt

[57] ABSTRACT

A solid component of catalyst for the (co)polymerization of ethylene is composed of a silica carrier and a catalytically active part including titanium, magnesium, chlorine and alkoxylic groups and is obtained: by suspending an activated silica in a solution of magnesium chloride and titanium tetraalcoholate in a liquid aliphatic acid ester; eliminating the aliphatic acid ester from the resulting suspension to recover a solid; and making this solid react with an aluminium alkyl chloride. It is preferable to add also some measured quantities of a silicon halide to the solution in aliphatic acid ester.

12 Claims, No Drawings

SOLID COMPONENT OF CATALYST FOR THE (CO)POLYMERIZATION OF ETHYLENE

This application is a Continuation of application Ser. No. 07/773,421, filed on Oct. 9, 1991, now abandoned.

The present invention concerns a solid component of catalyst, the procedure for its preparation and its use in the polymerization of ethylene and copolymerization of ethylene with alpha-olefins.

It is known that ethylene, or generally alpha-olefins, can be polymerized at low pressure with Ziegler-Natta catalysts. These catalysts are usually composed of a compound of elements from subgroups IV to VI of the periodic table (compounds of transition metals), mixed with an organometallic compound, or hydride, of the elements in groups I to III of the periodic table.

Catalysts are also known in the art, in which the compound of transition metal is fixed to a solid carrier, either organic or inorganic, and sometimes physically and/or chemically treated. Examples of such solid carriers are the oxygenated compounds of bivalent metals (such as oxides, inorganic oxygenated salts and carboxylates) or hydroxychlorides or the chlorides of bivalent metals.

Solid components of catalysts are already known in the art, obtained by activating a complex compound containing magnesium, titanium, halogen, alkoxylic groups and an electron donor with an aluminium halide. This complex compound can be deposited on a porous-type carrier and then activated, giving solid components of catalyst particularly suitable for the polymerization or the copolymerization of ethylene in gaseous phase. This technique is described in U.S. Pat. Nos. 4,354,009, 4,359,561, 4,370,456, 4,379,758 and 4,383.095.

These catalysts with carrier allow the production of polyethylenes in a flowing granulated form, problems often arise, however, caused by the limited rheology of the polymer due to the presence of fine products and the friability of the granules. Another problem consists of low productivity, referring to the quantity of polymer which can be obtained for every unit by weight of the catalyst.

It has now been discovered that it is possible to obtain solid components of Ziegler-Natta catalysts on a carrier prepared with microspheroidal silica and a solution of magnesium chloride and a titanium alcoholate in an aliphatic acid ester, using a simple and convenient procedure which produces solid components of catalyst having an improved catalytic activity in the (co)polymerization of ethylene and capable of giving polyethylenes which have good rheology.

In accordance with this, the present invention concerns a procedure for the preparation of a solid component of catalyst for the (co)polymerization of ethylene, composed of a carrier of silica in particles (50–90% by weight) and a catalytically active part (50–10% by weight) containing titanium, magnesium, chlorine and alkoxylic groups. This procedure is characterized by the following stages:

(a) a solution of titanium tetraalcoholate $Ti(OR)_4$ (where R represents a linear or branched alkyl radical, containing from 1 to 5 carbon atoms) and magnesium chloride in a liquid aliphatic acid ester, with a molar ratio between the titanium tetraalcoholate and magnesium chloride ranging from 0.2/1 to 5.0/1, is prepared;

(b) silica in particles is impregnated using the solution prepared under (a), by suspending the silica particles in the solution;

(c) the ester is eliminated from the suspension obtained in (b) by means of evaporation at a temperature which does not exceed 60° C. and a solid in silica particles is recovered on which a complex compound $Ti(OR)_4 \cdot (0,2-5,0)MgCl_2$ is deposited;

(d) the solid obtained in (c) is made to react with an alkyl aluminium chloride at an operating temperature ranging from 10° to 100° C., over a time range from 10 minutes to 24 hours;

(e) the solid component of catalyst is recovered.

Preferably, a silicon halide is also added to the solution obtained in (a), in such quantities as to have an atomic ratio between the silicon, in the silicon halide, and the titanium, in the titanium tetraalcoholate, ranging from 0.5/1 to 8.0/1. It is even more preferable for the silicon halide to be added in such quantities as to have a ratio ranging from 2.0/1 to 6.0/1. The use of silicon halide further improves the activity of the catalyst.

According to the procedure of the present invention, a solution of titanium tetraalcoholate and magnesium chloride in a liquid aliphatic acid ester is prepared in phase (a). Examples of titanium tetraalcoholates suitable for this purpose are titanium tetra-n-propylate, titanium tetra-n-butylate, titanium tetra-i-propylate and titanium tetra-i-butylate. The magnesium chloride used is preferably a totally anhydrous, or almost totally anhydrous (water content less than 1% by weight) magnesium chloride. The liquid aliphatic acid ester suited for the purpose should be chosen from methylic and ethylic esters of lower aliphatic carboxylic acids, chlorinated or non-chlorinated, such as ethyl formate, methyl acetate, ethyl acetate, propyl acetate, isopropyl acetate and ethyl chloroacetate. The preferred ester is ethyl acetate. It is convenient to use solutions having a global concentration of titanium tetraalcoholate and magnesium chloride of approx. 4–10% by weight and, it is preferable for the molar ratio between the titanium tetraalcoholate and magnesium chloride to be approx. 1:1.

It is also preferable for a silicon halide to be present in the solution obtained in (a), in the above-mentioned quantities. The silicon halide should be chosen from silicon tetrahalides and halogen silanes. Specific examples of these compounds are silicon tetrachloride, trichlorosilane, vinyl trichlorosilane, trichloroethoxy silane, chloroethyl trichlorosilane. Silicon tetrachloride is preferred in this particular case.

Preferably the solution described in (a) is prepared by dissolving the components in aliphatic acid ester at room temperature or higher, if possible at the reflux temperature of the ester used.

In phase (b) of the procedure of the present invention, silica in particles is impregnated using the solution prepared in (a), by suspending the silica particles in the solution. For this purpose, microspheroidal, porous silica is preferable, with a particle size ranging from 10 to 100 μm, a $SiO_2$ content of >90% by weight, a surface area ranging from 250 to 400 m$^2$/g, pore volume of from 1.3 to 1.8 ml/g and average pore diameter ranging from 20 to 30 nm. This silica should undergo activation treatment before being impregnated, which can be carried out either by heating the silica in an inert atmosphere, at a temperature ranging from approx. 100° C. to approx. 650° C., over a period from 1 to 20 hours, or by putting the silica in contact with an organometallic compound, such as a magnesium alkyl or an aluminium alkyl, for example magnesium butyl, octyl magnesium butyl and aluminium triethyl, operating at room temperature or at higher temperatures, for example approx. 60° C. It is preferable for the silica to be activated by treatment with octyl magnesium butyl, in quantities of approx. 10–20% by weight of silica. Impregnation in phase (b) of the procedure should preferably be carried out at a temperature ranging from 50° to 75° C., over a period of from 0.5 to 5 hours.

In phase (c) of the procedure, the ester is eliminated from the suspension obtained in (b) by means of evaporation and a solid is recovered in silica particles onto which a complex compound is deposited, of titanium tetraalcoholate and magnesium chloride in a molar ratio ranging from 0.2/1 to 5.0/1, preferably about 1:1, depending on the quantity used in phase (a). The evaporation of the aliphatic acid ester should be carried out at a temperature which does not exceed 60° C., possibly at a reduced pressure. Total evaporation of the ester is not necessary and at the end of the process, it may be present in quantities of up to 20% by weight, preferably approx. 5–10% by weight with respect to the weight of magnesium chloride.

In phase (d) of the procedure, the solid obtained in (c) is made to react with an alkyl aluminium chloride, with an atomic ratio between the chlorine atoms, in the alkyl aluminium chloride, and the alkoxylic groups, of the titanium alcoholate, ranging from 0.5/1 to 7.0/1. More specifically, in phase (d), the solid is suspended in an inert hydrocarbon liquid such as hexane or heptane, and is put in contact with an alkyl aluminium chloride, generally chosen from diethyl aluminium chloride, ethyl aluminium sesquichloride, diisobutyl aluminium chloride and isobutyl aluminium dichloride, dissolved in the above hydrocarbon solvent or in a different hydrocarbon solvent. The process is carried out at a temperature ranging from 10° to 100° C., for a period which, depending on the chosen operating temperature, can vary from 10 minutes to 24 hours. The preferred operating temperature ranges from 20° to 90° C., over a period of 10 minutes to 1 hour, to obtain an atomic ratio between the chlorine and titanium in the solid ranging from 2/1 to 14/1. This treatment has the effect of increasing the chlorine content in the solid component of catalyst, with a contemporary reduction, either partial or total, of the titanium from the tetravalent state to the trivalent state, and with the partial or total elimination of the alkyoxylic groups present.

At the end of the treatment, the solid component of catalyst is recovered in phase (e), is washed with a liquid aliphatic hydrocarbon solvent, such as hexane or heptane, until the chlorides have been eliminated from the washing liquid, and finally dried.

The solid component of catalyst, according to the present invention, is composed of a silica carrier in particles (50–90% by weight) and a catalytically active part (50–10% by weight) including titanium, magnesium and chlorine, and also alkoxylic groups. It is preferable for the solid component of catalyst to contain silicon in addition, with an atomic ratio between the silicon and titanium ranging from 0.5/1 to 8.0/1, preferably from 2.0/1 to 6.0/1.

The present invention also concerns a catalyst for the (co)polymerization of ethylene, composed of the above-mentioned solid component of catalyst, combined with an organometallic compound of aluminium (co-catalyst) chosen from aluminium trialkyls and aluminium alkyl halides (particularly chlorides), containing from 1 to 5 carbon atoms in the alkyl section. Among these, aluminium trialkyls are preferable, with from 2 to 4 carbon atoms in the alkyl section, :such as aluminium triethyl, aluminium tributyl and aluminium triisobutyl. The catalyst of the present invention has an atomic ratio between the aluminium (in the co-catalyst) and the titanium (in the solid component of catalyst) which generally ranges from 20:1 to 250:1, preferably from 100:1 to 200:1.

The catalyst of the present invention can be used in polymerization processes carried out by means of the suspension technique in an inert diluent or using the method of the gas phase, in a fluidized or stirred bed. The alpha-olefins which can be copolymerized are generally those containing from 3 to 10 carbon atoms, preferably from 4 to 6 carbon atoms, such as butene-1, hexene-1 and 4-methyl-pentene-1. The general polymerization conditions are: temperature from 50° to 100° C., total pressure from 5 to 40 bar, with a ratio between the partial pressures of hydrogen and ethylene of from 0 to 10. There is, at any rate, high productivity in the olefinic polymer and the polymer thus obtained has excellent rheological properties and, in particular, is in the form of granules which are non-friable and without fine products.

In the experimental examples which follow and which are intended to provide a better illustration of the present invention, a microspheroidal silica carrier is used, having a particle size ranging from 20 to 60 μm, a $SiO_2$ content of >99% by weight, a surface area of 320 m²/g, pore volume of 1.65 ml/g and average pore diameter of 25–26 nm.

EXAMPLE 1

6.60 g (19.4 mmoles) of titanium tetra-n-butylate, 1.87 g (19.6 mmoles) of anhydrous magnesium chloride and 150 ml of anhydrous ethyl acetate are charged in a nitrogen atmosphere into a 250 ml flask equipped with a reflux cooler, mechanical stirrer and thermometer. The mixture is heated to reflux temperature (approx. 77° C.) 60° C. for 1 hour, to allow for the complete dissolution of the magnesium chloride.

11.4 g of microspheroidal silica, previously activated by contact for 1 hour, at 60° C., with a solution containing 150 ml of anhydrous n-hexane and 13 ml of 20% by weight of octyl magnesium butyl in heptane, are suspended in the solution thus obtained. The suspension is kept at a temperature of 60° C. for 1 hour.

It is then dried by evaporating the solvent at a temperature which is not higher than 60° C. and at a reduced pressure and a solid is recovered onto which the complex compound $Ti(OBu)_4 \cdot MgCl_2$ has been deposited.

The solid thus obtained is suspended in 70 ml of anhydrous n-hexane and 18 ml of a 40% by weight solution of aluminium ethyl sesquichloride (6.08 g; 23.6 mmoles) in n-decane, are added to the resulting suspension. Contact is maintained for 15 minutes at a temperature of 25° C. The solid is then recovered by filtration, washed with anhydrous n-hexane until all the chlorides in the washing liquid have been eliminated, and finally dried at a reduced pressure.

A solid component of catalyst is thus obtained, in solid granule form, containing 70% by weight of silica, with the catalytically active part which contains magnesium, titanium, chlorine and butoxy groups in a molar ratio of 2.2:1.0:5.3:0.4.

The solid component of catalyst prepared in the above way, is used in a test for the polymerization of ethylene. More specifically, the polymerization is carried out in a 5 litre autoclave containing 2 litres of n-hexane. The process is carried out at a pressure of 15 bar, in the presence of hydrogen, with a ratio between the pressure of the hydrogen and that of the ethylene of 0.47/1, at a temperature of 90° C. and over a period of 2 hours, using 150 mg of the solid component of catalyst and aluminium triethyl as a co-catalyst, with an atomic ratio between the aluminium in the co-catalyst, and the titanium, in the solid component of catalyst, of 50/1.

A yield equal to 3.8 kg of polyethylene per gram of solid component of catalyst is thus obtained and the polyethylene has the following characteristics:

density: 0.961 g/ml
(ASTM D-1505)
apparent density: 0.38
(ASTM D 1895)
MFI (2.16 kg): 2.5 g/10'
(Melt-Flow Index—ASTM d-1238)
MFR: 31.4
(MFR=Melt-Flow Index Ratio, defined as a ratio MFI (21.6 kg)/MFI (2.16 kg)).

The polyethylene is also in granule form with the following size distribution percentage by weight in μm:

| >2000 | 0.1% by weight |
| 2000< >1000 | 2.8% by weight |
| 1000< >500 | 78.2% by weight |
| 500< >250 | 17.4% by weight |
| <250 | 1.5% by weight. |

EXAMPLE 2

6.60 g (19.4 mmoles) of titanium tetra-n-butylate, 1.87 g (19.6 mmoles) of anhydrous magnesium chloride and 150 ml of anhydrous ethyl acetate and 9.0 ml of silicon tetrachloride (13.2 g, 77.8 mmoles) are charged in a nitrogen atmosphere into a 250 ml flask, equipped with a reflux cooler, mechanical stirrer and thermometer. The mixture is heated to reflux temperature (approx. 77° C.) for 1 hour, to allow for the complete dissolution of the magnesium chloride.

11.4 g of microspheroidal silica previously activated by contact for 1 hour at 60° C., with a solution containing 150 ml of anhydrous n-hexane and 13 ml of 40% by weight octyl magnesium butyl in n-heptane, are suspended in the solution thus obtained. The suspension is kept at a temperature of 60° C. for 1 hour.

It is then dried by evaporating the solvent at a temperature which is not higher than 60° C. and at a reduced pressure and a solid is recovered on which the complex compound $Ti(OBu)_4 \cdot MgCl_2$ is deposited.

The solid thus obtained is suspended in 70 ml of anhydrous n-hexane and 18 ml of a 40% by weight solution of aluminium ethyl sesquichloride in n-decane (6.08 g; 23.6 mmoles), are added to the resulting suspension. Contact is maintained for 15 minutes at a temperature of 25° C. The solid is then recovered by filtration, washed with anhydrous n-hexane until all the chlorides in the washing liquid have been eliminated and finally dried at a reduced pressure.

A solid component of catalyst is thus obtained, in solid granule form, containing 70% by weight of silica, with a catalytically active part containing magnesium, titanium, chlorine and butoxy groups in a molar ratio of 1.4:1.0:7.3:0.4.

The solid component of catalyst prepared in the above way, is used in a test for the polymerization of ethylene. More specifically, the polymerization is carried out in a 5 litre autoclave containing 2 litres of n-hexane. The process is carried out at a pressure of 15 bar, in the presence of hydrogen, with a ratio between the pressure of the hydrogen and that of the ethylene of 0.47/1, at a temperature of 90° C. over a period of 2 hours, using 75 mg of the solid component of catalyst and aluminium triethyl as co-catalyst, with an atomic ratio between the aluminium, in the co-catalyst, and the titanium, in the solid component of catalyst, of 100/1.

A yield equal to 6.6 kg of polyethylene per gram of the solid component of catalyst is obtained and the polyethylene has the following characteristics:

density: 0.961 g/ml
(ASTM D-1505)
apparent density: 0.31
(ASTM D 1895)
MFI (2.16 kg): 3.3 g/10'
(Melt-Flow Index—ASTM D-1238)
MFR: 30.2

The polyethylene is in granule form with the following size distribution percentage by weight in μm:

| >2000 | 5.7% by weight |
| 2000< >1000 | 45.8% by weight |
| 1000< >500 | 45.0% by weight |
| 500< >250 | 2.6% by weight |
| <250 | 0.9% by weight |

EXAMPLE 3

6.60 g (19.4 mmoles) of titanium tetra-n-butylate, 1.87 g (19.6 mmoles) of anhydrous magnesium chloride and 150 ml of anhydrous ethyl acetate and 4.5 ml of silicon tetrachloride (6.6 g; 38.9 mmoles) are charged in a nitrogen atmosphere into a 250 ml flask equipped with a reflux cooler, mechanical stirrer and thermometer. The mixture is heated to reflux temperature (approx. 77° C.) for 1 hour to allow for the complete dissolution of the magnesium chloride.

11.4 g of microspheroidal silica, previously activated by contact for 1 hour, at 60° C., with a solution containing 150 ml of anhydrous n-hexane and 13 ml of 40% by weight of octyl magnesium butyl in n-heptane, are suspended in the solution thus obtained. The suspension is kept at a temperature of 60° C. for 1 hour.

It is then dried by evaporating the solvent at a temperature which is not higher than 60° C. and at a reduced pressure and a solid is recovered on which the complex compound $Ti(OBu)_4 \cdot MgCl_2$ is deposited.

The solid thus obtained is suspended in 70 ml of anhydrous n-hexane and 18 ml of a 40% by weight solution of aluminium ethyl sesquichloride in n-decane (6.08 g; 23.6 mmoles), are added to the resulting suspension. Contact is maintained for 15 minutes at a temperature of 25° C. The solid is then recovered by filtration, washed with anhydrous n-hexane until all the chlorides in the washing liquid have been eliminated, and is finally dried at a reduced pressure.

A solid component of catalyst is thus obtained, in solid granule form, containing 70% by weight of silica, with the catalytically active part containing magnesium, titanium, chlorine and butoxy groups in a molar ratio of 1.5:1.0:6.0:0.7.

The solid component of catalyst prepared in the above way, is used in a test for the polymerization of ethylene. More specifically, the polymerization is carried out in a 5 litre autoclave containing 2 litres of n-hexane. The process is carried out at a pressure of 15 bar, in the presence of hydrogen, with a ratio between the pressure of the hydrogen and that of the ethylene of 0.47/1, at a temperature of 90° C., over a period of 2 hours, using 100 mg of the solid component of catalyst and aluminium triethyl as co-catalyst, with an atomic ratio between the aluminium, in the co-catalyst, and the titanium, in the solid component of catalyst, equal to 70/1.

A yield equal to 6.8 kg of polyethylene per gram of the solid component of catalyst, is obtained and the polyethylene has the following characteristics:
density: 0.960 g/ml (ASTM D-1505)
apparent density: 0.25
(ASTM D 1895)
MFI (2.16 kg): 1.96 g/10'
(Melt-Flow Index—ASTM D-1238)
MFR: 34.7

The polyethylene is in granule form with the following size distribution percentage by weight in µm:

| | |
|---|---|
| >2000 | 14.5% by weight |
| 2000< >1000 | 46.5% by weight |
| 1000< >500 | 30.5% by weight |
| 500< >250 | 6.5% by weight |
| <250 | 2.0% by weight |

We claim:

1. A solid component of catalyst for the (co)polymerization of ethylene, comprising 50–90% by weight of silica particles, and 10–50% by weight of a mixture containing titanium, magnesium, chlorine and alkoxy groups, prepared by a process comprising the following steps:

(A) suspending microspheroidal, porous silica particles having a particle size of from 10 to 100 µm, a $SiO_2$ content of greater than 90% by weight, a surface area of from 250 to 400 m²/g, a pore volume of from 1.3 to 1.8 ml/g and an average pore diameter of from 20 to 30 nm, activated by heating in an inert atmosphere or by contact with an organometallic compound of magnesium, in a solution of $Ti(OR)_4$ and magnesium chloride in a liquid aliphatic acid ester to provide a suspension, wherein R represents a linear or branched alkyl radical of from 1 to 5 carbon atoms, said magnesium chloride contains less than 1% by weight of water, and said $Ti(OR)_4$ and said magnesium chloride are present in a molar ratio of from 0.2/1 to 5/1;

(B) evaporating said liquid aliphatic ester from said suspension at a temperature which does not exceed 60° C. to provide a solid wherein a complex compound $Ti(OR)_4 \cdot (0.2-5.0)MgCl_2$ is deposited on silica particles;

(C) reacting said complex compound $Ti(OR)_4 \cdot (0.2-5.0)MgCl_2$ deposited on silica particles with an aluminum alkyl chloride at a temperature of from 10° to 100° C. for a length of time of from 10 minutes to 24 hours to provide said catalyst for the (co)polymerization of ethylene; and (D) recovering said solid component of catalyst for the (co)polymerization of ethylene.

2. The catalyst of claim 1, wherein said solution of $Ti(OR)_4$ and magnesium chloride further contains a silicon halide selected from the group consisting of silicon tetrahalides and halogen silanes in an amount sufficient to provide an atomic ratio of silicon to titanium of from 0.5/1 to 8.0/1.

3. The catalyst of claim 2, wherein said silicon halide is present in an amount sufficient to provide an atomic ratio of silicon and titanium of from 2.0/1 to 6.0/1.

4. The catalyst of claim 2 or 3, wherein said silicon halide is selected from the group consisting of silicon tetrachloride, trichlorosilane, vinyl trichlorosilane, trichloroethoxy silane and chloroethyl trichlorosilane.

5. The catalyst of claim 4, wherein said silicon halide is silicon tetrachloride.

6. The solid component of catalyst of claim 1, wherein said $Ti(OR)_4$ is selected from the group consisting of titanium tetra-n-propylate, titanium tetra-n-butylate, titanium tetra-i-propylate and titanium tetra-i-butylate, said liquid aliphatic acid ester is selected from the group consisting of ethyl formate, methyl acetate, ethyl acetate, propyl acetate, isopropyl acetate and ethyl chloroacetate, and said $Ti(OR)_4$ and said magnesium chloride are present in a molar ratio of approximately 1:1.

7. The solid component of catalyst of claim 6, wherein said liquid aliphatic acid ester is ethyl acetate.

8. The solid component of catalyst of claim 6, wherein said step (b) is conducted at a temperature of from 50° to 75° C. over a period of time of from 0.5 to 5 hours.

9. The solid component of catalyst of claim 1, wherein said complex compound contains $Ti(OR)_4$ and $MgCl_2$ in a molar ratio of approximately 1:1.

10. The solid component of catalyst of claim 9, wherein said complex compound is $Ti(OR)_4 \cdot MgCl_2$.

11. The solid component of catalyst of claim 1, wherein said aluminum alkyl chloride is selected from the group consisting of diethyl aluminum chloride, ethyl aluminum sesquichloride, diisobutyl aluminum chloride and isobutyl aluminum dichloride, wherein the chlorine atoms in said aluminum alkyl chloride and the alkoxy groups in said $Ti(OR)_4$ are present in a ratio of from 0.5:1 to 7.0:1, and said reacting step (c) is performed at a temperature of from 20° to 90° C. over a period of time of from 10 minutes to 1 hour.

12. The solid component of catalyst of claim 1, wherein said magnesium chloride is anhydrous.

* * * * *